Nov. 28, 1950  R. E. KNOEDLER  2,531,572
TRACTOR SEAT SUPPORT
Filed Nov. 24, 1947  2 Sheets-Sheet 1

INVENTOR.
Roy E. Knoedler
BY Victor J. Evans & Co.
ATTORNEYS

Nov. 28, 1950 R. E. KNOEDLER 2,531,572
TRACTOR SEAT SUPPORT
Filed Nov. 24, 1947 2 Sheets-Sheet 2

INVENTOR.
Roy E. Knoedler
BY Victor J. Evans & Co.
ATTORNEYS

Patented Nov. 28, 1950

2,531,572

UNITED STATES PATENT OFFICE 2,531,572

TRACTOR SEAT SUPPORT

Roy E. Knoedler, Macomb, Ill., assignor to Knoedler Manufacturers, Inc., Streator, Ill., a corporation of Illinois Application November 24, 1947, Serial No. 787,796

5 Claims. (Cl. 155—9)

This invention relates to spring or resilient seats for tractors and other equipment where it is not convenient to suspend the body on springs, and in particular a resilient seat mounting wherein a seat is projected ahead of mounting elements and pivotally supported in the ends of bars that are resiliently held upwardly by a spring and the upward movement is checked by fluid pressure means in a hydraulic cylinder.

The purpose of this invention is to provide riding comfort for operators of tractors and the like without changing the structure of the tractor.

Owing to the construction of the usual type of tractor and also of other similar equipment the seat for the operator is mounted directly on the frame of the machine and as these machines are used on comparatively rough terrain riding thereon is rough. With this thought in mind this invention contemplates an improved seat support which makes it possible for the operator of a tractor or the like to ride in comfort.

Furthermore, in supplanting the usual seat support of a tractor or the like with resilient mounting elements it has been found that certain limitations are necessary as the resilient supporting elements should be mounted on the same foundation that was provided for the seat and at the same time the seat should occupy substantially the same position. To accomplish this end it was found necessary to provide an angularly-shaped base, the lower end of which is adapted to be bolted to the usual seat foundation, and extend the base backwardly and upwardly with the seat projected forwardly and carried by pivotally mounted bars that are adjustably held on resilient supporting means.

The object of this invention is, therefore, to provide an improved resilient supporting element for seats for tractors and the like that replaces the usual seat supporting elements without materially changing the position of the seat.

Another object of the invention is to provide an improved resilient seat support in which the forward edge of the seat tilts upward as the seat moves downward to flex the knees of the operator as the feet remain in a fixed position.

Another object of the invention is to provide an improved seat mounting for the operator's seat of tractors and the like in which the rebound or upward movement of the seat is checked by fluid pressure means.

A further object of the invention is to provide an improved seat support for resiliently mounting seats of tractors and the like which is of a simple and economical construction.

This invention is an improvement over the resilient seat support of the copending application with the Serial Number 704,587 of Frederick E. Knoedler, in that I have moved the seat supporting elements back behind the seat to prevent unnecessarily raising the seat, and shortened the upper pair of bars to elevate the forward edge of the seat as it moves downward in order to facilitate bending the knees.

With the above objects and advantages in view the invention consists of the new and novel combination, construction, and arrangement of parts as more fully hereinafter described, set forth in the claims appended hereto, and disclosed in the accompanying drawings, forming part hereof, wherein:

Figure 8 is also a similar section taken on line 8—8 of Figure 1.

Figure 1:
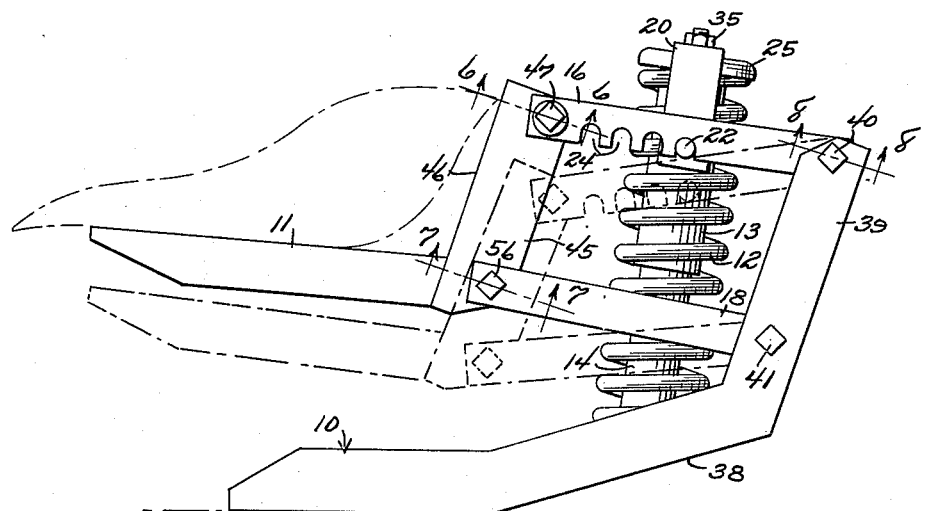
Figure 1 is a view showing a side elevation of the improved resilient seat support.

Referring now to the drawings wherein like reference characters indicate corresponding parts the improved resilient seat support of this invention includes a channel-shaped base 10, a channel-shaped seat support 11, a spring 12, a shock absorber unit having an upper jacket 13 and a cylinder 14, a pair of upper bars 15 and 16, and a pair of lower bars 17 and 18, wherein the bars pivotally connect the seat to the base and the spring and shock absorber unit influences the seat support upwardly through the bars and checks the upward movement thereof.

Figure 3:
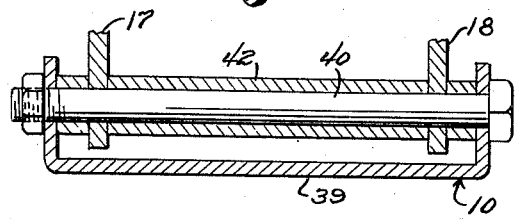
Figure 3 is a view similar to that shown in Figure 1 showing a longitudinal section through the seat support taken on line 3—3 of Figure 2.
Figure 3:
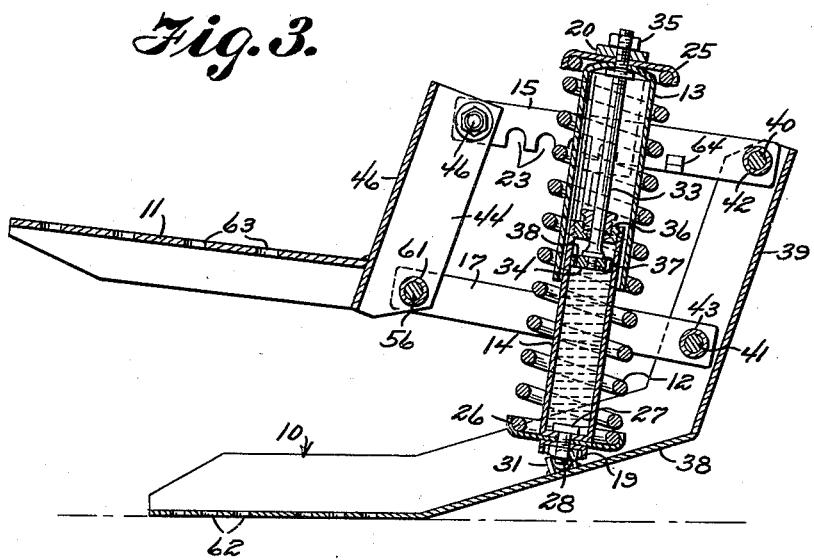
Figure 4:
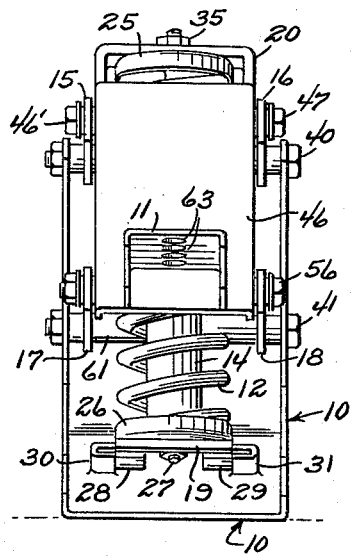
Figure 4 is a view showing a front elevation of the seat support.
Figure 5:
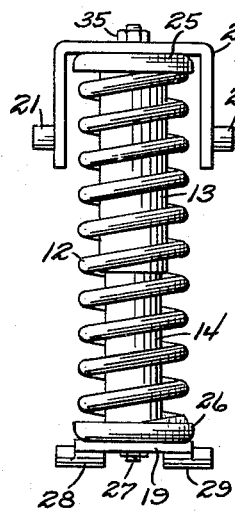
Figure 5 is a view showing a front elevation of the resilient and checking element with the side bars and supporting structure omitted.

The lower end of the spring is pivotally mounted on a bracket 19 and the upper end carries an inverted U-shaped saddle 20 with outwardly extending pins 21 and 22 that are positioned to extend into notches 23 and 24 in the lower edges of the upper bars 15 and 16 and by changing the pins from one set of notches to another the length of the leverage from the fulcrum or pivotal support to the point where the load is carried is adjusted so that comparatively light weight or heavy operators may be carried by the seat with the same degree of comfort. The ends of the spring are held by cup-shaped washers 25 and 26 and the washer 26 at the lower end is attached to the bracket 19 by a bolt 27. The bracket 19 is provided with laterally extending pins 28 and 29 that are pivotally held in sockets 30 and 31 as shown in Figures 3 and 4, on an upwardly inclined section 38 of the base.

The lower end of the cylinder 14 is also held on the bolt 27 and the jacket 13 is positioned on a piston rod 33 extending upward from a piston 34 in the cylinder 14 and the upper end of the piston rod extends through the saddle 20 and is held thereto by a nut 35. The piston rod extends through a stuffing box 36 at the upper end of the cylinder 14 and the piston is provided with a large opening 37 having a valve therein and also a relatively small orifice 38 wherein as the seat moves downward fluid passes through the piston rapidly passing through the opening 37 whereas the upward movement is restricted by the flow of fluid through the orifice 38 whereby upward movement of the seat influenced by the rebound of the spring is checked. It will be understood that oil, air, or any suitable fluid may be used in the cylinder.

Figure 6:
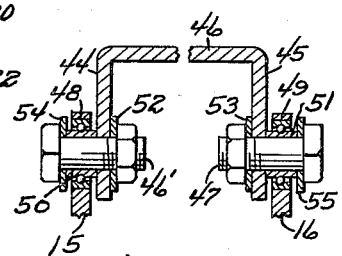
Figure 6 is a detail showing a cross section on line 6—6 of Figure 1 with the bolts shown in elevation.
Figure 7:
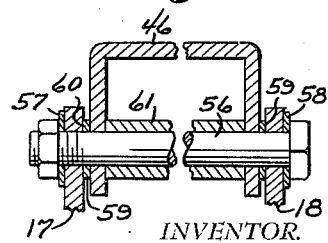
Figure 7 is a similar section taken on line 7—7 of Figure 1 with parts omitted.

The upper and lower pairs of bars are pivotally mounted in an upwardly extending section 39 of the base through bolts 40 and 41 with spacing sleeves 42 and 43 holding the bars laterally, as shown in Figure 8. The extending ends of the bars are pivotally attached to flanges 44 and 45 of an upwardly extending channel-shaped section 46 of the seat support 11 with the upper bars 15 and 16 mounted as shown in Figure 6 and the lower bars 17 and 18 mounted as shown in Figure 7. The ends of the upper bars 15 and 16 are pivotally held on pins 46 and 47 through bearings 48 and 49 and bushings 50 and 51 with washers 52 and 53 on the inside of the flanges 44 and 45 and washers 54 and 55 at the outer ends of the bushings. The ends of the bars 17 and 18 are pivotally held on a bolt 56 with washers 57 and 58 on the outside of the bars and washers 59 and 60 between the bars and flanges of the section 46. A tubular spacing sleeve 61 is also provided on the pin between the flanges 44 and 45.

As illustrated by the dotted lines in Figure 1 the radius or length of the bars 15 and 16 is shorter than that of the bars 17 and 18 so that as the seat support moves downwardly the upper end of the section 46 is drawn backward and the forward edge of the seat upward wherein with the feet of the operator resting on a fixed or stationary part of the frame of the vehicle the knees may flex or bend with the movement of the seat.

The base 10 and seat support 11 are provided with openings 62 and 63 respectively to correspond with bolt holes in the seat and mounting structure therefor and with the base formed as shown in Figures 1 and 3 the resilient mounting elements are positioned behind the seat and in an open area in the structure of the tractor so that the seat may be resiliently supported on a tractor or the like without materially changing the elevation or position thereof, and by adjusting the position of the pins in the notches it will be adapted for comfortably carrying heavy operators or operators of comparatively light weight.

Figure 2:
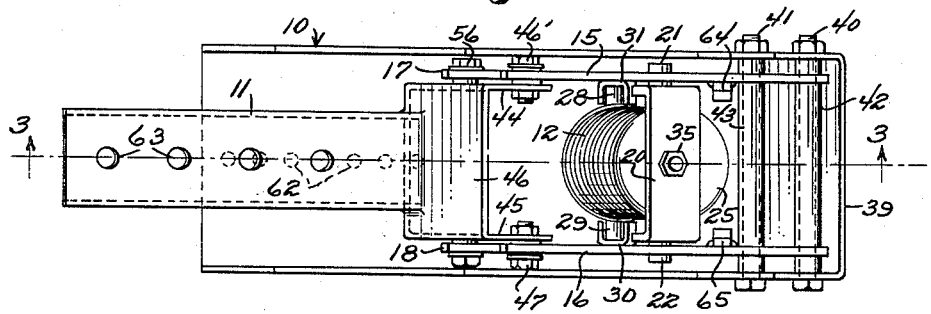
Figure 2 is a plan view of the seat support.

The position of the spring and shock absorber unit may readily be changed by raising the seat support 11 until the notches 23 and 24 leave the pins 21 and 22 wherein the pins may be moved to another set of notches. The backward movement of the unit is limited by lugs 64 and 65 on the upper pair of bars 15 and 16, as shown in Figures 2 and 3 so that the unit can not fall out of place when the pins are released.

It will be understood that modifications may be made in the design and arrangement of the parts without departing from the spirit of the invention.

What is claimed is:

1. A seat support comprising a base having rearwardly and upwardly sloping sections extending from the rear end thereof, upper and lower pairs of bars pivotally mounted on the upwardly sloping section of the base, a seat support having an upwardly sloping back pivotally mounted through said back to the said bars, a vertically disposed spring positioned between the said pairs of bars, means pivotally mounting the lower end of the spring on the rearwardly sloping section of the base, and a saddle carried by the upper end of the spring and having means positioned to coact with one of said pairs of bars wherein the seat support is resiliently held upwardly by the spring, the position of said coacting means being adjustable in relation to the pivotal mounting of the bars to compensate for the load carried by the seat support.

2. A seat support comprising a base having rearwardly and upwardly sloping sections extending from the rear end thereof, upper and lower pairs of bars pivotally mounted at one end on the upwardly sloping section of the base, a seat support having an upwardly sloping back pivotally mounted through said back to the other ends of the bars, a vertically disposed spring positioned between said pairs of bars, means pivotally mounting the lower end of the spring on the rearwardly sloping section of the base, and a saddle carried by the upper end of the spring and having means positioned to coact with one of said pairs of bars for resiliently urging the seat support upwardly, means associated with the spring for checking the rebound thereof, and means adjusting the position of the saddle in relation to the pivotal mounting of the ends of the bars to compensate for loads carried by the said seat support.

3. A seat support comprising a base having rearwardly and upwardly sloping sections extending from the rear end thereof, upper and lower pairs of bars pivotally mounted at one end to the upwardly sloping section of the base, a seat support having an upwardly sloping back pivotally mounted in and carried by the other ends of the bars, a hydraulic cylinder having a piston therein positioned between the pairs of bars, said piston having a valve therein permitting free downward movement thereof and a restricted opening checking upward movement thereof, a spring positioned around said cylinder, means pivotally connecting the lower end of the cylinder and spring to the rearwardly sloping section of the base, a saddle with laterally extending pins on the lower ends of downwardly extending arms carried by the upper end of the cylinder and spring, the lower edges of the upper pair of bars having a series of notches therein to receive the laterally extending pins of the saddle, and means tilting the seat support as it is moved downward.

4. In a seat support, the combination, which comprises, a base, channel-shaped in cross section, having rearwardly and upwardly sloping sections, pairs of bars pivotally mounted on the upwardly sloping section of the base, a seat support with an upwardly sloping back pivotally attached through the back to the extending ends of the bars and carried thereby, one of said pairs of bars having notches in the lower edges thereof, a hydraulic cylinder pivotally mounted on the rearwardly sloping section of the base, a saddle with laterally extending pins in downwardly extending arms thereof carried by the upper end of said cylinder, said pins positioned to coact with the notches of the bars to adjustably hold the saddle in relation to the bars, means in said cylinder for retarding upward movement thereof, and a spring around said cylinder for retarding downward movement of the saddle.

5. In a seat support for tractors and the like, the combination, which comprises, a base, channel-shaped in cross section, having a horizontal section with rearwardly and upwardly sloping sections extending from the rear end thereof, a seat support having an upwardly inclined channel-shaped back, pairs of bars connecting the seat support to the base with the ends thereof pivotally mounted in the upwardly sloping section of the base and upwardly inclined back of the seat support, one of said pairs of bars having notches in the lower edges thereof, a hydraulic cylinder positioned between the said pairs of bars, a piston in said cylinder having a valved large orifice therein and a restricted opening retarding upward movement thereof, means pivotally mounting the said cylinder on the base, a saddle at the upper end of the cylinder having downwardly extending arms with outwardly extending pins thereon positioned with the pins registering with the notches of one of the pairs of bars, said pins and notches providing adjustment of the cylinder to increase or decrease the leverage to compensate for the load carried by the seat support, and a spring on said cylinder.

ROY E. KNOEDLER.

REFERENCES CITED

The following references are of record in the file of this patent:

UNITED STATES PATENTS

| Number | Name | Date |
|---|---|---|
| 1,960,939 | Hansen | May 29, 1934 |
| 2,366,730 | Hickman | Jan. 9, 1945 |
| 2,432,554 | Knoedler | Dec. 12, 1947 |
| 2,486,048 | McIntyre et al. | Oct. 25, 1949 |

FOREIGN PATENTS

| Number | Country | Date |
|---|---|---|
| 634,647 | Germany | Sept. 1, 1936 |